(12) United States Patent
Pickerd et al.

(10) Patent No.: US 10,904,042 B2
(45) Date of Patent: *Jan. 26, 2021

(54) PASSIVE VARIABLE CONTINUOUS TIME LINEAR EQUALIZER WITH ATTENUATION AND FREQUENCY CONTROL

(71) Applicant: Tektronix, Inc., Beaverton, OR (US)

(72) Inventors: John J. Pickerd, Hillsboro, OR (US); Kan Tan, Portland, OR (US); Pirooz Hojabri, San Jose, CA (US)

(73) Assignee: Tektronix, Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/116,677

(22) Filed: Aug. 29, 2018

(65) Prior Publication Data

US 2019/0103999 A1 Apr. 4, 2019

Related U.S. Application Data

(63) Continuation-in-part of application No. 15/721,591, filed on Sep. 29, 2017.

(Continued)

(51) Int. Cl.
*H03H 7/46* (2006.01)
*H04B 17/30* (2015.01)
*H04L 25/03* (2006.01)

(52) U.S. Cl.
CPC .. *H04L 25/03031* (2013.01); *H04L 25/03885* (2013.01); *H04L 2025/03585* (2013.01)

(58) Field of Classification Search
CPC .. H04B 10/674; H04B 1/0057; H04B 1/0475; H04B 1/1018; G01R 13/0272; H04L 2025/03585; H04L 25/03031

(Continued)

(56) References Cited

U.S. PATENT DOCUMENTS 4,727,424 A 2/1988 Chao
4,953,026 A 8/1990 Kobayashi et al.
(Continued)

FOREIGN PATENT DOCUMENTS

JP H02090871 3/1990
WO 2015021481 A2 2/2015
(Continued)

OTHER PUBLICATIONS

European Patent Office, Partial European Search Report for European Application 19155624.0, dated Jul. 19, 2019, 19 pages, Munich, Germany.

(Continued)

*Primary Examiner* — Philip Sobutka
(74) *Attorney, Agent, or Firm* — Miller Nash Graham & Dunn; Andrew J. Harrington

(57) ABSTRACT

A continuously or step variable passive noise filter for removing noise from a signal received from a DUT added by a test and measurement instrument channel. The noise filter may include, for example, a splitter splits a signal into at least a first split signal and a second split signal. A first path receives the first split signal and includes a variable attenuator and/or a variable delay line which may be set based on the channel response of the DUT which is connected. The variable attenuator and/or the variable delay line may be continuously or stepped variable, as will be discussed in more detail below. A second path is also included to receive the second split signal and a combiner combines a signal from the first path and a signal from the second path into a combined signal.

23 Claims, 6 Drawing Sheets

Related U.S. Application Data

(60) Provisional application No. 62/626,622, filed on Feb. 5, 2018.

(58) Field of Classification Search
 USPC .................................................. 455/296, 302
 See application file for complete search history.

(56) References Cited

U.S. PATENT DOCUMENTS

| | | | |
|---|---|---|---|
| 5,220,163 | A | 6/1993 | Toughlian et al. |
| 6,085,104 | A | 7/2000 | Kowalski et al. |
| 8,581,768 | B1 * | 11/2013 | Pagnanelli .............. H03M 3/30 341/143 |
| 10,097,222 | B2 * | 10/2018 | Pickerd ................. H04B 1/0057 |
| 2006/0133599 | A1 | 6/2006 | Pagnanelli |
| 2007/0064923 | A1 | 3/2007 | Schmukler |
| 2008/0123756 | A1 | 5/2008 | Daniels |
| 2009/0002213 | A1 | 1/2009 | Lamarche |
| 2014/0072025 | A1 | 3/2014 | Matsudaira et al. |
| 2014/0348018 | A1 | 11/2014 | Bharadia et al. |
| 2015/0104191 | A1 | 4/2015 | Hajimiri et al. |
| 2017/0054469 | A1 | 2/2017 | Heiskanen et al. |

FOREIGN PATENT DOCUMENTS

| | | |
|---|---|---|
| WO | 2015021481 A3 | 3/2015 |
| WO | 2015048678 | 4/2015 |

OTHER PUBLICATIONS

Han Su et al., A Digitally Assisted Analog Cancellation System at RF Frequencies for Improving the Isolation Performance of a Ceramic Duplexer, Oct. 4, 2016, pp. 61-64, 46th European Microwave Conference, European Microwave Association, London, UK.

Nabeel A. Riza and Suran Sumriddetchkajorn, Micromechanics-Based Wavelength-Sensitive Photonic Beam Control Architectures and Applications, Feb. 20, 2000, pp. 919-932, vol. 39 No. 6, Applied Optics, Optical Society of America, Washington DC, US.

European Patent Office, Extended European Search Report for European Application 19155624.0, dated Nov. 22, 2019, 21 pages, Munich, Germany.

* cited by examiner

PASSIVE VARIABLE CONTINUOUS TIME LINEAR EQUALIZER WITH ATTENUATION AND FREQUENCY CONTROL

PRIORITY

This disclosure is a continuation-in-part of U.S. Non-Provisional application Ser. No. 15/721,591, titled "VARIABLE PASSIVE NETWORK NOISE FILTER FOR NOISE REDUCTION" filed Sep. 29, 2017, which claims priority to U.S. Provisional Application No. 62/414,455, titled "CTLE VARIABLE PASSIVE NETWORK NOISE FILTER FOR NOISE REDUCTION," which are both incorporated herein by reference in their entirety. This disclosure also claims benefit of U.S. Provisional Application No. 62/626,622, titled "PASSIVE VARIABLE CTLE WITH ATTENUATION AND FREQUENCY CONTROL," filed on Feb. 5, 2018, which is incorporated herein by reference in its entirety.

FIELD OF THE INVENTION

This disclosure is directed to systems and methods associated with aspects of a test and measurement system, and, more particularly, to systems and methods for controlling noise and frequency attenuation in the test and measurement system.

BACKGROUND

Test and measurement systems are designed to receive signal inputs, e.g., from a Device Under Test (DUT), sample the signals, and display the result as a waveform. An input channel of the test and measurement system can add noise to the signal from the DUT. Sometimes, individualized fixed passive noise filters can be built to filter out the added noise to the signal by test and measurement system. However, the noise filters depend on the channel characteristic of the test and measurement instrument as well as the type of signal received from the DUT. For the individualized fixed noise filters to be beneficial, a user would need a number of various fixed noise filters on hand to best match the loss and the data rate of the channel being used to test the DUT. These various different fixed noise filters are expensive and it can be difficult to keep track of which noise filter is needed for a given test situation.

Some active noise filters are programmable and may be used in place of the individualized fixed passive noise filters. However, these programmable active noise filters often create too much noise to be useful in a large variety of situations. Further, the bandwidth of these programmable active noise filters is often not extendable up to higher bandwidths, such as 70 GHz. What is needed is a wide bandwidth noise filter that minimizes the use of a number of components, as well as maximizes the bandwidth that can be achieved.

Embodiments of the disclosure address these and other deficiencies of the prior art.

BRIEF DESCRIPTION OF THE DRAWINGS

Aspects, features and advantages of embodiments of the present disclosure will become apparent from the following description of embodiments in reference to the appended drawings in which.

DESCRIPTION

Disclosed herein is a continuously or step variable passive noise filter for removing noise from a signal received from a DUT added by a test and measurement instrument channel. The noise filter may include, for example, a splitter configured to split a signal into at least a first split signal and a second split signal, each of the first and second split signals. A first path receives the first split signal and includes a variable attenuator and/or a variable delay line which may be set based on the test and measurement instrument channel with which the DUT is connected. The variable attenuator and/or the variable delay line may be continuous or stepped, as will be discussed in more detail below. A second path is also included to receive the second split signal and a combiner combines a signal from the first path and a signal from the second path into a combined signal.

The second path may include a fixed delay line and can, in some instances, be a reference signal. The signal in the first path is delayed and attenuated to adjust for the noise added by the test and measurement instrument, and then the signal in the first path is subtracted from the reference signal on the second path to determine the input signal without the added noise of the test and measurement instrument channel. Various embodiments of such a noise filter are discussed below with respect to FIGS. 1-6.

Embodiments of the disclosures provide an improvement by reducing noise in the test and measurement instrument, as well as allowing a test and measurement instrument channel to have a frequency response with a continuous time linear equalizer (CTLE) shape response. The reduction in noise can be achieved without keeping a plurality of different CTLE filters on hand and having to replace the filters based on a specific test situation—rather, the variable attenuator and/or the variable delay line can be programmed or set based on the needs of the test. Embodiments of the disclosure are also able to be implemented in high frequency bandwidths, such as 70 GHz or above.

Figure 1:
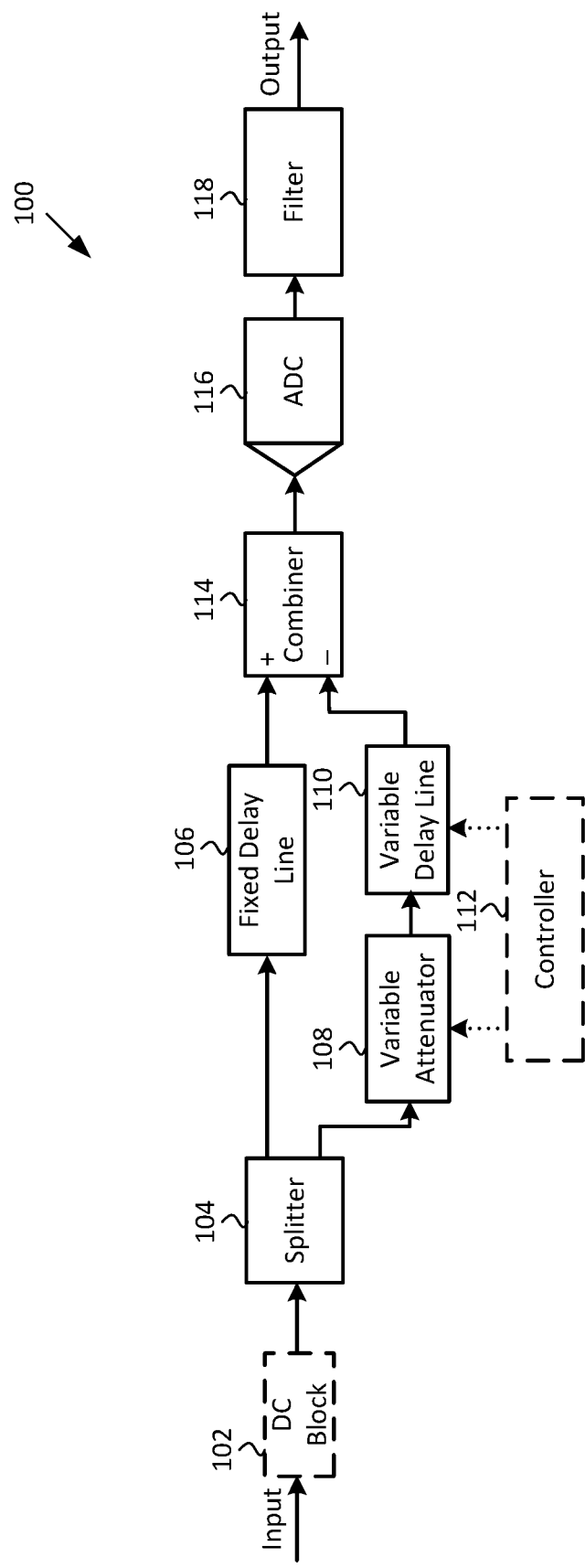
FIG. 1 is an example block diagram of a noise filter having a variable attenuator and/or a variable delay line according to some embodiments of the disclosure.

FIG. 1 illustrates a block diagram of an example noise filter 100 according to some embodiments of the disclosure. The noise filter 100 may be, for example, a CTLE filter. The noise filter 100 includes an optional direct current (DC) block 102 configured to receive an input signal, such as a signal from a device under test (not shown). The DC block 102 can be configured, for example, to allow radio frequency (RF) signals to pass through while blocking audio and DC frequency interference. The noise filter 100 may also include a splitter 104 to receive an output from the DC block 102, or the input signal if DC Block 102 is omitted. The splitter 104 may be, for example, a Wilkinson splitter, which has 3 decibels (dB) of signal loss. However, embodiments of the disclosure are not limited to such a splitter, but may include any splitter that splits the signal into split signals. In some instances, the splitter can be configured to split the signal such that each split signal substantially includes the entire bandwidth of the input signal. For example, another type of splitter that may be used is a three-resistor power splitter or a multiplexer.

The output of the splitter 104 is provided to two signal paths. The first signal path includes a fixed delay line 106. The second signal path includes a variable attenuator 108 and a variable delay line 110. In this example embodiment, the variable attenuator 108 and the variable delay line 110 are continuously variable. Although both the attenuator 108 and the delay line 110 are shown as continuously variable, embodiments are not limited to such a combination. Rather, only one of the attenuator 108 and the delay 110 may be viable. Other variations will be discussed in more detail below with respect to FIGS. 2-6. Further, embodiments are not limited to the signal in the second signal path being attenuated by the attenuator 108 prior to being delayed by the delay line 110. As will be understood by one skilled in the art, in some embodiments, although not shown, the signal in the second signal path may be delayed through delay line 110 prior to being attenuated by attenuator 108.

The variable attenuator 108 and/or the variable delay line 110 may be adjusted manually or by a controller 112. The controller 112 is illustrated but embodiments of the disclosure are not limited to this implementation. Rather, the variable attenuator 108 and/or the variable delay line 110 may be adjusted manually by a user.

The variable attenuator 108 may control the difference in magnitude in dB between the low frequencies and the high frequencies. Adjusting the variable attenuator 108 does not move the pole location of the overall noise filter 100. That is, the attenuator 108 only changes the height of the frequency response peak without moving it in frequency. As such, it may be adjusted to accommodate different DUT channel loss for a given data rate. The variable delay line 110, on the other hand, moves the pole location of the noise filter 100 in frequency without changing the range of magnitude between the high and low frequencies. As such, the variable delay line 110 can be adjusted to accommodate different data rate signals. That is, the variable attenuator 108 or the variable delay line 110 can be adjusted either manually or by a controller based on which channel of the test and measurement instrument a signal from the DUT is received so that any noise added by that channel may be removed. For example, as will be discussed in more detail below, a user can determine a desired attenuation amount and/or delay amount and set the settings for the variable attenuator 108 or change the delay line 110 lengths to the desired amounts. In other embodiments, a user may be able to set the desired amounts on the test and measurement instrument, which then transmits instructions to the controller to adjust the variable attenuator 108 and/or the variable delay line 110. Further, in some embodiments, the test and measurement instrument may have specific attenuation amounts and/or delay saved in a memory with respect to each channel of the test and measurement instrument and may instruct the controller based on which channel the DUT is connected.

A combiner 114 receives a signal from both the first signal path and the second signal path and combines the two signals together to obtain a negative branch summation. The combiner 114 should either subtract the signals from the first signal path and the signal second path or combine the signals from the first signal path and the second signal path when one path is inverted to accomplish the negative branch summation. For example, in some embodiments, the combiner 114 may be a balun, which includes an inverted input and a non-inverted input, which provides a desired shape for the noise filter frequency response. In some embodiments, the balun may be a 6 dB loss balun. As another example, in some embodiments the combiner 114 may be an active differential amplifier, which is able to operate all the way to zero frequency as well as provide gain.

The combined signal may be converted from an analog signal to a digital signal through an analog-to-digital converter 116. The digital signal may be saved in a memory or processed further in the test and measurement instrument. In some embodiments, a filter 118 may also be provided in the noise filter 100, which may be a lowpass filter, a de-embed filter, and/or a reshaping filter, to filter the digital signal further prior to being either stored in a memory or further processed through a test and measurement system, such as an oscilloscope (not shown). A lowpass filter, if used, can limit the bandwidth of the digitized signal to only include the first slope and peak of the digital signal. For example, the noise filter 100 response may be sinusoidal in shape, and only the first slope is used. A de-embed filter, if used, can reshape the frequency response of the test and measurement instrument channel back to a flat response. In so doing, the noise introduced by the noise filter 100 will be reduced without reducing the noise of the DUT. Finally, the attenuator 108 and/or delay line 110 can be adjusted so that the output of the noise filter 100 is as close to the desired response as possible. If a reshaping filter is used, the reshaping filter then further reshapes the output to be the desired response. The reshaping filter may be used, for example, whenever a test and measurement instrument channel is required to have a frequency response with a specific industry standard CTLE shape response.

The output of the ADC 116 or the filter 118 is substantially similar to the input signal, but a varying frequency attenuation caused by test and measurement instrument channel has been removed by combining through the combiner 114 the signal in the first path that is delayed and attenuated based on the channel of the test and instrument measurement to which the DUT is connected, and the signal on the second path, which is delayed by a known fixed delay.

Figure 2:
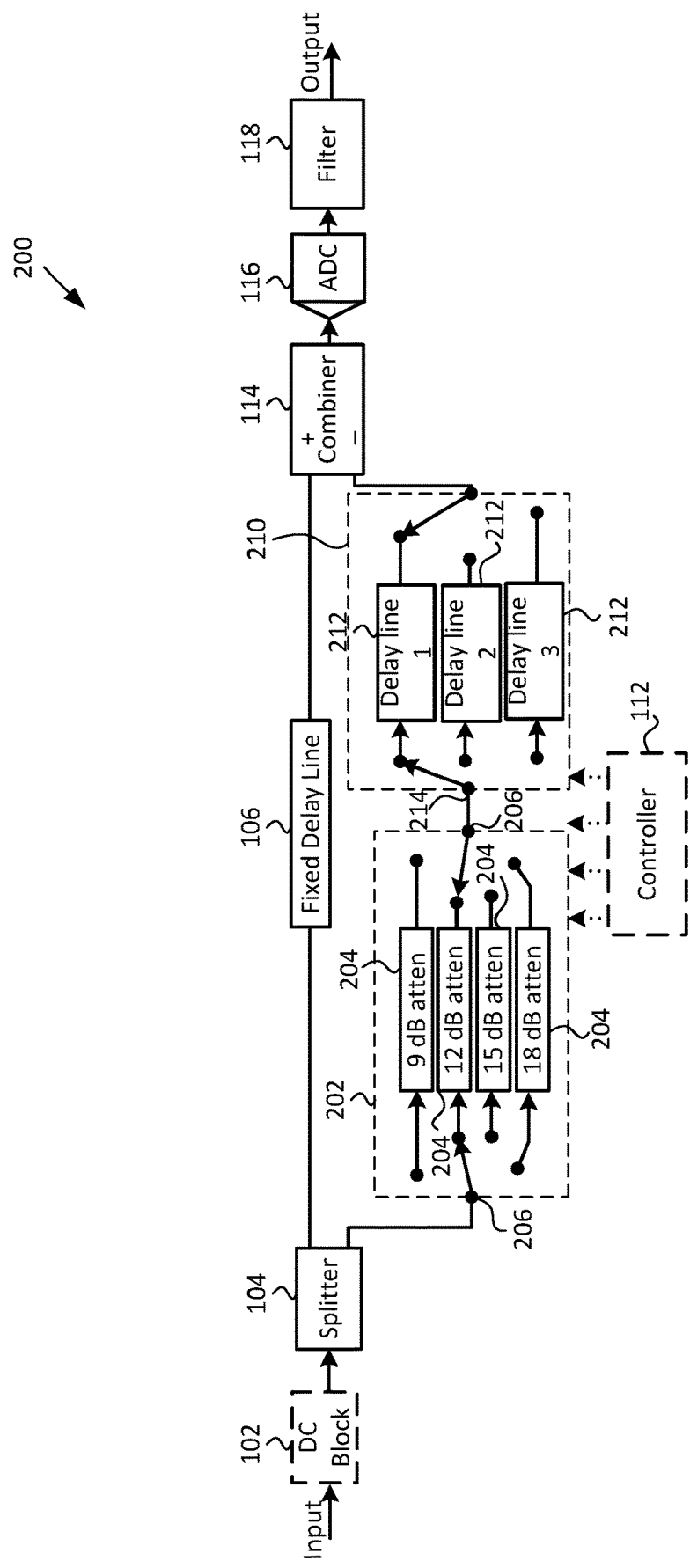
FIG. 2 is another example block diagram of a noise filter having a variable attenuator and/or a variable delay line according to other embodiments of the disclosure.

FIG. 2 illustrates a block diagram of another example noise filter 200 according to some embodiments of the disclosure. Similar to FIG. 1, the noise filter 200 may include a DC block 102, a splitter 104, a fixed delay 106, a combiner 114, an ADC 116, and a filter 118, similar to those and their variations discussed above. As such, these components are not described again in detail with respect to FIG. 2. The noise filter 200, as discussed below, provides stepped control of the noise filter frequency response, rather than a continuous control like the noise filter 100 of FIG. 1.

The noise filter 200 of FIG. 2 also includes a variable attenuator 202 and/or a variable delay line 210, similar to FIG. 1. However, one or both of the variable attenuator 202 and/or the variable delay line 210 is composed of a number of fixed components that can be switched into or out of the second signal path.

For example, the variable attenuator 202 may include a number of fixed attenuators 204 that vary the attenuation amount. Although the fixed attenuators 204 list various attenuation amounts, such is shown only for illustration and it will be understood by one skilled in the art that the disclosure is not limited to these specific fixed attenuator amounts. Rather, the fixed attenuators 204 may have attenuation amounts different from those illustrated in FIG. 2. A single pole multi throw switch 206 may be provided to switch a selected attenuation amount to the second signal path. The switch may be switched may be switched manually by a user or may be operated by a controller 112.

In some embodiments, the variable delay line 210 may also include a number of fixed delay lines 212 that vary the delay amount. A single pole multi throw switch 214 may be provided to switch a selected delay amount to the second signal path. Similar to the variable attenuator 202, the switch may be switched manually by a user or may be operated by the controller 112. In some embodiments, a separate controller 112 may be provided for each of the variable attenuator 202 and the variable delay line 210.

Although FIG. 2 illustrates both the variable attenuator 202 and the variable delay line 210 including a plurality of fixed components and switches, in some embodiments, as will be appreciated by one skilled in the art, only one of the attenuator 200 and the delay line 210 includes the fixed components and the switches, while the other is either a single fixed component or is a variable attenuator 108 or variable delay line 110 discussed above. That is, the variable attenuators 108 and 200 and the variable delay lines 110 and 210 may be provided any combination, including one of the attenuators 108 and 200 or the delay lines 110 and 210 being fixed.

In the embodiment illustrated in FIG. 2, twelve possible frequency response settings are provided based on the four fixed attenuators 204 and the three fixed delay lines 212. However, embodiments are not limited to such an implementation. Rather, any number of fixed attenuators 204 may be present and switched into the second signal path, as well as any number of fixed delay lines 212.

Figure 3:
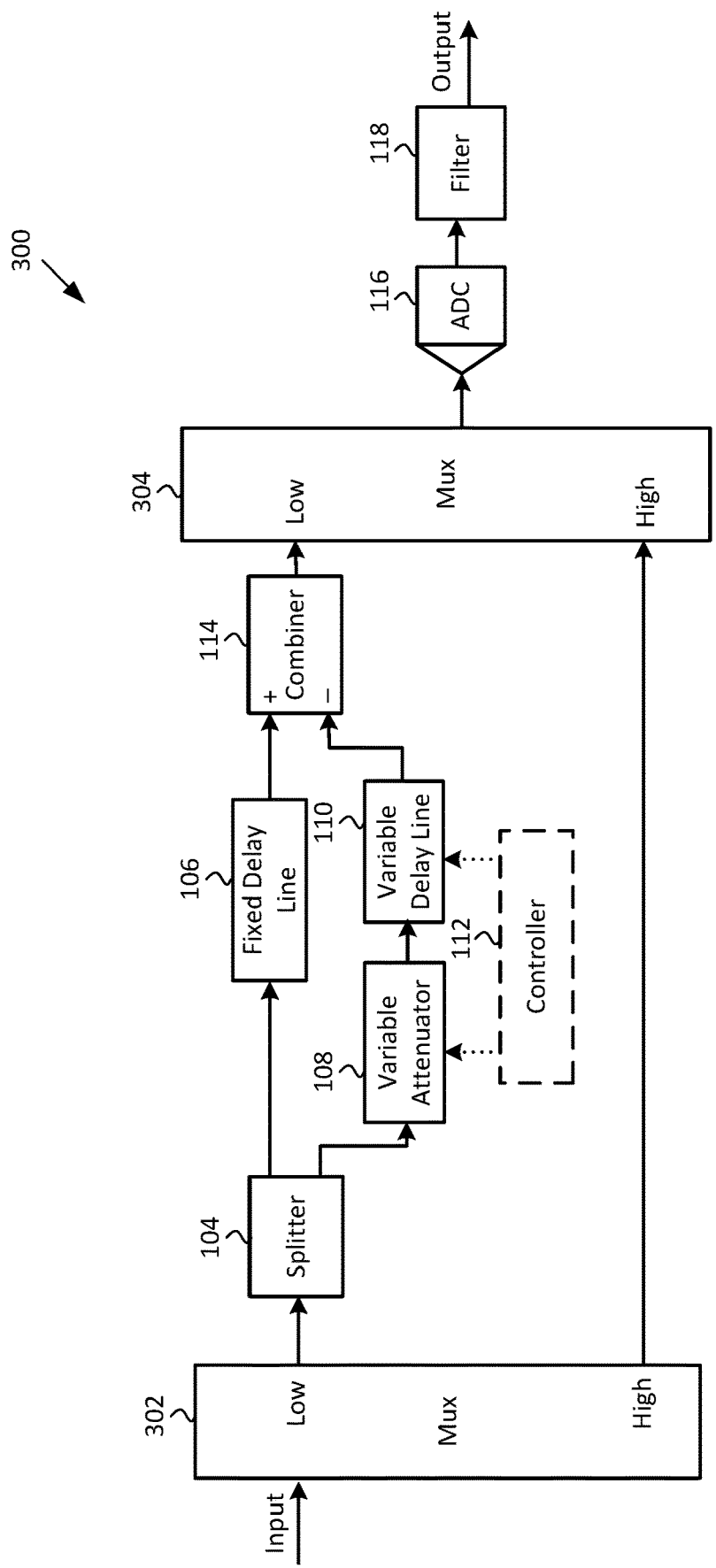
FIG. 3 is another example block diagram of a noise filter with a multiplexer to split an input signal into a high frequency band signal a low frequency band signal, the noise filter also including a variable attenuator and/or a variable delay line according to other embodiments of the disclosure.

FIG. 3 illustrates another example noise filter 300 according to embodiments of the disclosure. Similar to FIGS. 1 and 2, the noise filter 300 may include a splitter 104, a fixed delay 106, a controller 112, a combiner 114, an ADC 116, and a filter 118, similar to those and their variations discussed above. As such, these components are not described again in detail with respect to FIG. 3.

Noise filter 300 may include a multiplexer 302 to receive an input signal from a DUT. The multiplexer 302 is a passive device that implements frequency domain multiplexing. The multiplexer 302 may convert a signal, such as input signal, with a broad range of frequencies into two or more signal bands with mutually exclusive frequency ranges. A multiplexer 302 that converts a signal into two frequency bands may be referred to as a diplexer, a multiplexer that converts a signal into three frequency bands may be referred to as a triplexer, etc. For example, the multiplexer 302 is configured to separate the input signal into a plurality of frequency bands including a high frequency band and a low frequency band. The high frequency band and the low frequency band may then be forwarded along a high frequency channel and a low frequency channel, respectively.

The low frequency band may be received at the splitter 102, similar to FIGS. 1 and 2 discussed above. In the embodiment illustrated in FIG. 3, a variable attenuator 108 and a variable delay line 110 are shown in the second signal path. However, embodiments of the disclosure are not limited to this implementation. As will be understood by one skilled in the art, the variable attenuator 202 and/or the variable delay line 210 may be provided in the second signal path, similar to the embodiment shown in FIG. 2. Further, only one variable attenuator 108 or 202 or variable delay line 110 or 210 may be provided while the other component is fixed.

The combined signal from the combiner 114 is received at a multiplexer 304, which acts as a combiner to combine the low frequency band and the high frequency band together into a full bandwidth signal that may be converted by the ADC 116 and filtered by filter 118, if present.

The multiplexers 302 and 304 have a lower loss than splitter 102. For example, in the low frequency band, the multiplexers 302 and 304 have a few tenths of a decibel of loss and in the high band may have 1.5 to 3 decibels of loss depending on how wide of a bandwidth of the input signal. As such, noise filter 300 may be beneficial when a significant part of the loss is in the low band frequency of the input signal. The noise filter 300 may be used to better shape the signal in the low band frequency to provide better SNR while at the same time allowing the lower loss in the high band of the system to be captured with better resolution. Further, another advantage of the noise filter 300 is the variable attenuator 108 or 202 and/or the variable delay line 110 or 210 only operate over half the bandwidth of a system. For example, for a 50 GHz bandwidth system, the variable components only have to operate over 25 Ghz bandwidth.

Figure 4:
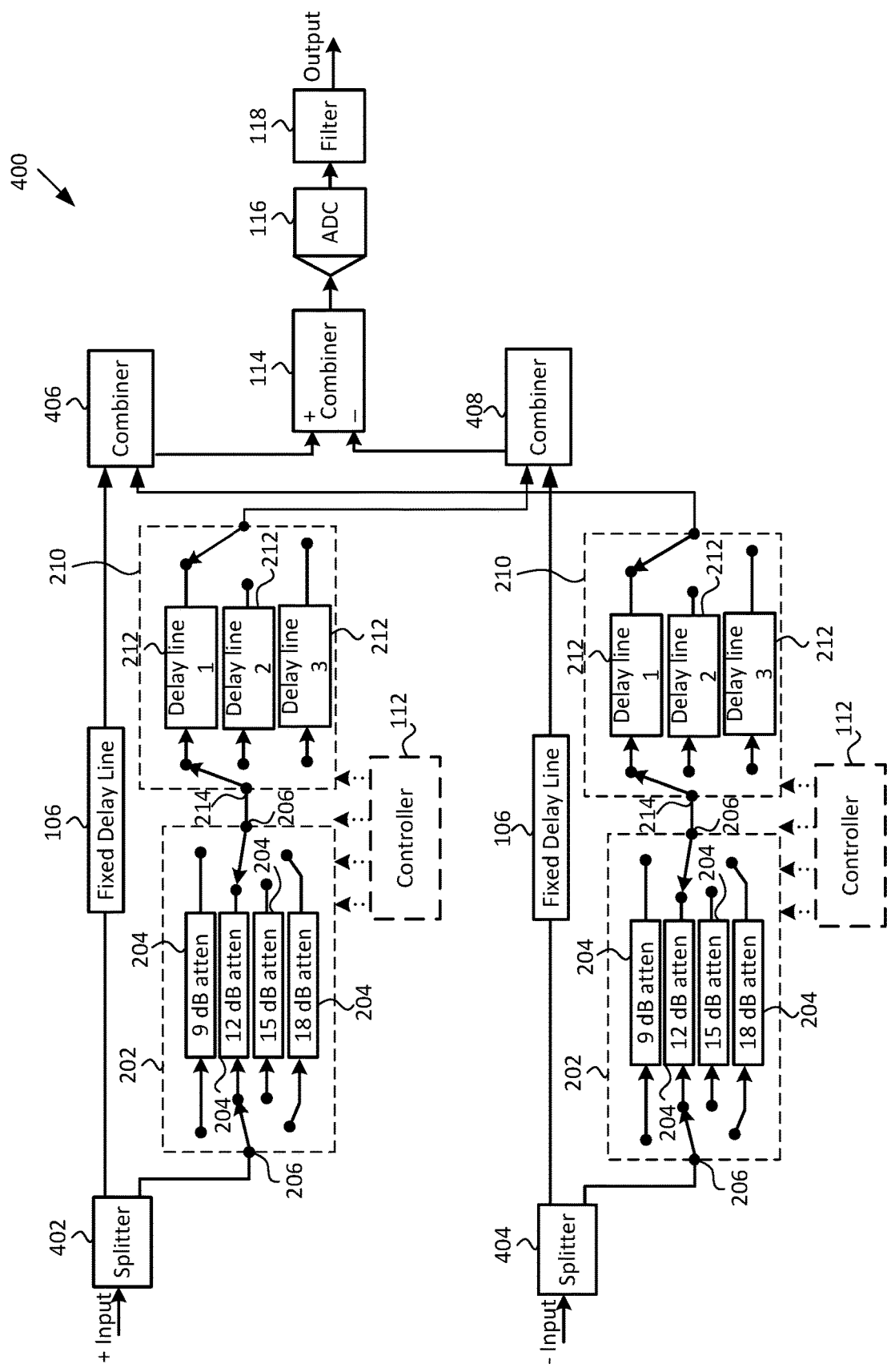
FIG. 4 is another example block diagram of a noise filter for a differential signal using cross-coupling of the positive and negative signals according to other embodiments of the disclosure.

FIG. 4 illustrates another example noise filter 400 according to some embodiments of the disclosure. The noise filter 400 may be used when a differential signal pair is received from a DUT. A splitter 402, similar to splitter 102, receives and splits the positive signal of the differential pair into a signal on a first positive signal path and a signal on a second positive signal path, while a splitter 404, similar also to splitter 102, receives and splits the negative signal of the differential pair into a signal on a first negative signal path and a signal on a second negative signal path.

Both the first positive and the first negative signal paths include a fixed delay 106, as illustrated in FIG. 4. The second positive and negative signal paths each include a variable attenuator 108 or 202 and/or a variable delay line 110 or 210. The embodiment of FIG. 4 illustrates the use of a variable attenuator 202 and a variable delay line 210, as discussed in detail above with respect to FIG. 2. However, as will be understood by one skilled in the art, any combination of variable attenuators 108 or 202 and variable delay lines 110 or 210 may be used, as well as with one of the components being fixed.

A combiner 406 receives the signal from the first positive signal path and the signal from the second negative signal path and combines the signals into a first combined signal. A second combiner 408 receives the signal from the second positive signal path and the first negative signal path and combines the signals into a second combined signal. In such an embodiment, since the positive and negative signals are being combined, the combiners 406 and 408 may be, for example, power combiners. The first and second combined signals are then received at a combiner 114, similar to that discussed above with respect to FIG. 1. The combiner 114 converts first and second combined signals into a single differential signal output which is received by ADC 116. That is, the noise filter 400 takes advantage of the differential signal pair to cross-couple the positive and negative signals to remove any attenuation from the test and measurement instrument channel.

Figure 5:
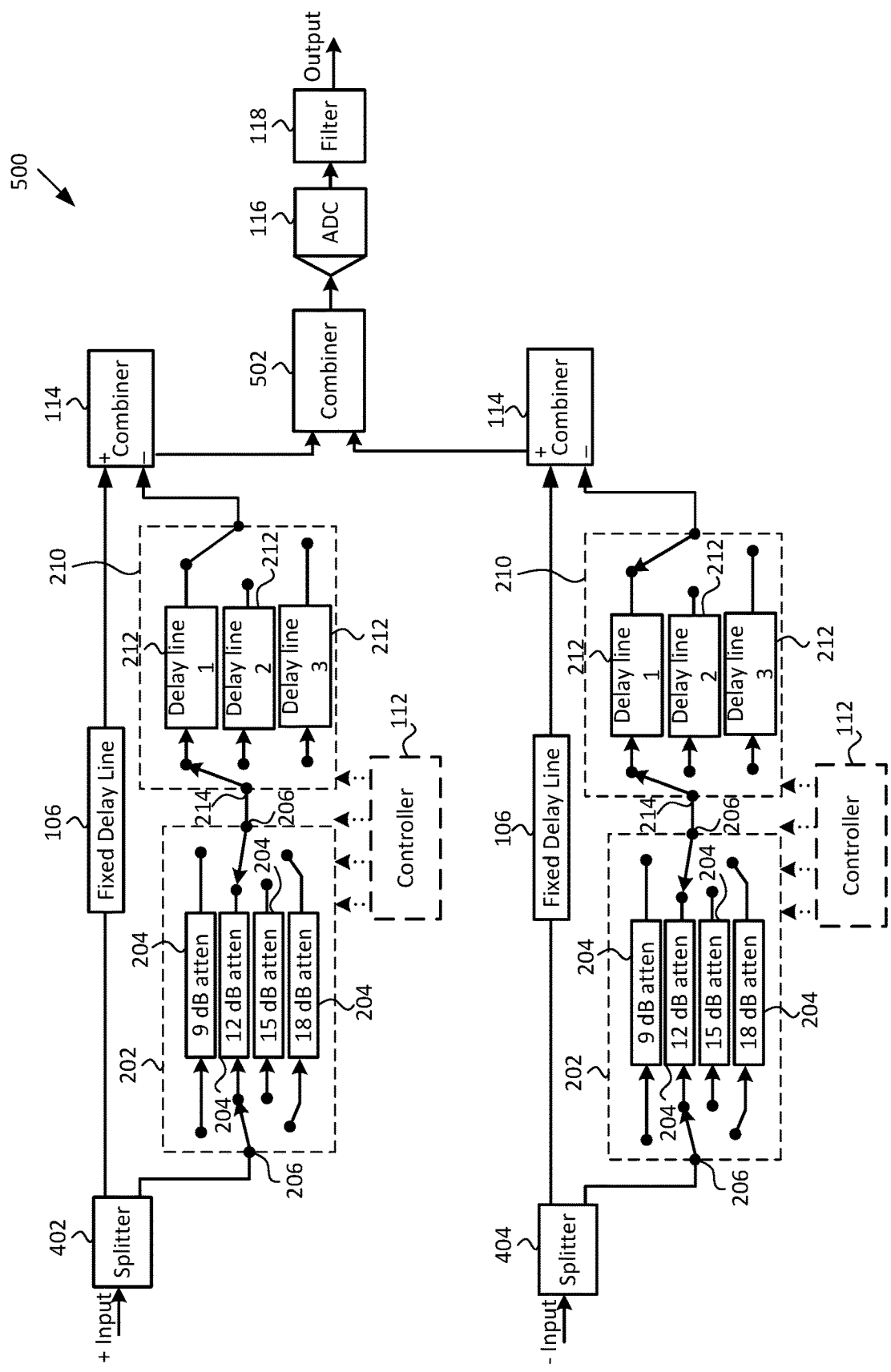
FIG. 5 is another example block diagram of a noise filter for a differential signal without cross-coupling according to other embodiments of the disclosure.

FIG. 5 illustrates a block diagram of another example noise filter 500 according to some embodiments of the disclosure. The noise filter 500 is similar to noise filter 400, except that there is no cross-coupling of the positive and negative signals of the differential signal pair, as shown in FIG. 4. As such, like components in FIGS. 4 and 5 are not further described with respect to FIG. 5. Rather than having two simple combiners 406 and 408 combined by cross-coupling the positive and negative signals, two combiners 114, either baluns or differential amplifiers, for example, as discussed above, may be provided to couple each of the respective split positive signals and the respective split negative signals. The combined positive signal and the combined negative signal may then be further combined through combiner 502.

Further, similar to FIG. 4, any combination of variable attenuators 108 or 202 and variable delay lines 110 or 210 may be used, as well as with one of the components being fixed.

Alternative to the noise filter 500, a noise filter may be provided, similar to that shown in FIG. 5, but rather than combining the positive and negative branches into a single differential signal, as shown in FIG. 5, positive and negative signals paths may be processed separately through respective ADCs 116 and filters 118 and sent to the test and measurement instrument for further processing or stored in a memory as a differential signal pair, and not a combined differential signal.

Figure 6:
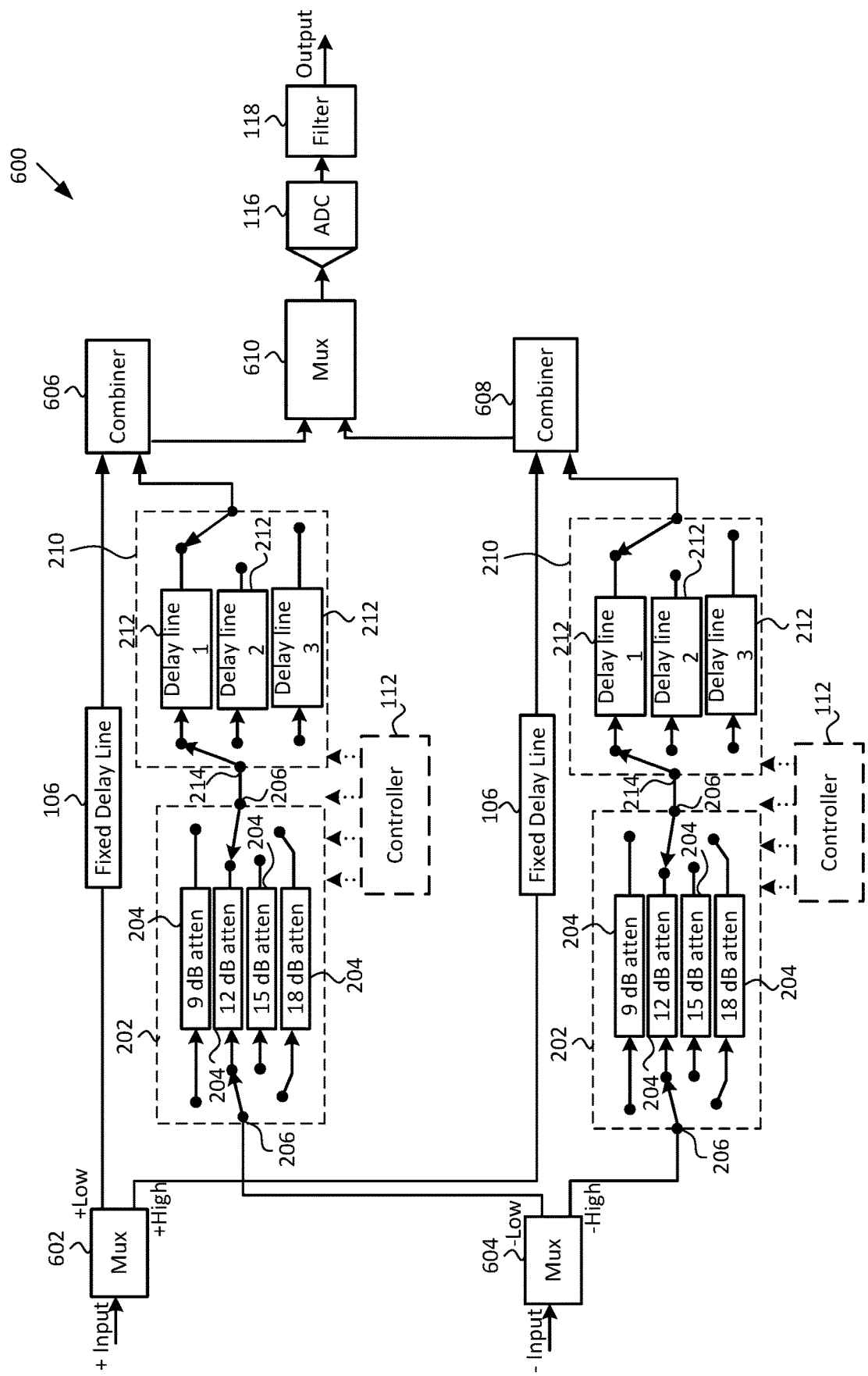
FIG. 6 is another example block diagram of a noise filter for a differential signal having multiplexers to split a positive input signal and a negative input signal into high frequency band signal a low frequency band signal.

FIG. 6 illustrates a block diagram of another example noise filter 600 for a differential signal according to some embodiments of the disclosure. In noise filter 600, multiplexers 602 and 604 may be used to split the positive signal and the negative signal of a differential pair input signal into respective low band frequency and high band frequency signals. Both the positive low frequency band and positive high frequency band are delayed through fixed delay lines 106. The negative low frequency band and the negative high frequency band are received at paths that include a variable attenuator 108 or 202 and/or a variable delay line 110 or 210. The embodiment of FIG. 6 illustrates the use of a variable attenuator 202 and a variable delay line 210, as discussed in detail above with respect to FIG. 2. However, as will be understood by one skilled in the art, any combination of variable attenuators 108 or 202 and variable delay lines 110 or 210 may be used, as well as with one of the components being fixed.

The signals on the positive and negative low frequency paths may be combined at combiner 606 and the positive and negative high frequency paths may be combined at combiner 608 to output a combined low frequency band signal and a combined high frequency band signal. These signals may then be combined through another multiplexer 610 into a full frequency band combined signal.

It will be appreciated that the multiplexer configuration could be implemented into the two channel configurations of FIGS. 1-3.

The above disclosed embodiments of the disclosure provide ways to adjust a frequency response of a noise filter over a high frequency bandwidth, such as frequency band widths at 70 GHz or greater, by having either a variable attenuator and/or a variable delay line in a signal path which may then be subtracted from a reference signal to remove noise added by a test and measurement instrument channel. Embodiments of the disclosure allow for a variable noise filter that can be programmed or set up for a variety of different test situations, rather than having to switch in a new noise filter for each test situation. Further, embodiments of the disclosure allow for adjusting the settings of a noise filter to test to a specific standard.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers (including monitoring modules), or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

Example 1 a noise filter, comprising a splitter configured to receive a signal and split the signal into at least a first split signal and a second split signal; a first path configured to receive the first split signal, the first path including: a variable attenuator, and a variable delay line; a second path configured to receive the second split signal; and a combiner configured to combine a signal from the first path and a signal from the second path into a combined signal.

Example 2 is the noise filter of example 1, wherein the second path includes a fixed delay line.

Example 3 is the noise filter of either one of examples 1 or 2, wherein at least one of the variable attenuator and the variable delay line are adjusted by a controller.

Example 4 is the noise filter of any one of examples 1-3, wherein the variable attenuator includes a plurality of attenuators, each attenuator having a different attenuation amount; and a plurality of switches, wherein the variable attenuator is adjusted by switching one of the plurality of attenuators into the first path.

Example 5 is the noise filter of any one of examples 1-4, wherein the variable delay line includes a plurality of delay lines, each delay line having a different delay amount; and a plurality of switches, wherein the variable delay line is adjusted by switching one of the plurality of delay lines into the first path.

Example 6 is the noise filter of any one of examples 1-5, wherein the combiner is a balun having an inverted input and a non-inverted input.

Example 7 is the noise filter of any one of examples 1-6, wherein the combiner is a differential amplifier.

Example 8 is the noise filter of any one of examples 1-7, further comprising a multiplexer configured to receive an input signal and separate the input signal into a high frequency band signal and a low frequency band signal, wherein the signal received by the splitter is the low frequency band signal.

Example 9 is the noise filter of example 8, wherein the multiplexer is a first multiplexer and the combined signal is a first combined signal, and the noise filter further comprises a second multiplexer configured to receive the first combined signal and the high frequency band signal and output a second combined signal.

Example 10 is the noise filter of any one of examples 1-9, further comprising an analog-to-digital converter configured to receive the combined signal and output a digital signal representing the combined signal; and a reshaping filter configured to receive the digital signal and output a filtered digital signal that matches a specific continuous time linear equalizer shape response.

Example 11 is a noise filter, comprising a first splitter configured to receive a positive signal of a differential signal pair and split the positive signal into at least a first split signal and a second split signal, each of the first and second split signal including substantially the entire bandwidth of the positive signal; a second splitter configured to receive a negative signal of the differential signal pair and split the negative signal into at least a third split signal and a fourth split signal, each of the third and fourth split signal including substantially the entire bandwidth of the negative signal; a first path configured to receive the first split signal, the first path including a first variable attenuator, and a first variable delay line; a second path configured to receive the second split signal; a third path configured to receive the third split signal, the third path including a second variable attenuator, and a second variable delay line; a fourth path configured to receive the fourth split signal; a first combiner configured to combine a signal from the first path and a signal from the fourth path into a first combined signal; a second combiner configured to combine a signal from the second path and a signal from the third path into a second combined signal; and a third combiner configured to combine the first combined signal and the second combined signal into a third combined signal.

Example 12 is the noise filter of example 11, wherein the second path and the fourth path includes a fixed delay line.

Example 13 is the noise filter of either example 11 or 12, wherein at least one of the first variable attenuator, the first variable delay line, the second variable attenuator and the second variable delay line are adjusted by a controller.

Example 14 is the noise filter of any one of examples 11-13, wherein at least one of the first variable attenuator and the second variable attenuator includes a plurality of attenuators, each attenuator having a different attenuation amount; and a plurality of switches, wherein the at least one of the first variable attenuator and the second variable attenuator is adjusted by switching one of the plurality of attenuators into the first path.

Example 15 is the noise filter of any one of examples 11-14, wherein at least one of the first variable delay line and the second variable delay includes a plurality of delay lines, each delay line having a different delay amount; and a plurality of switches, wherein at least one of the first variable delay line and the second variable delay is adjusted by switching one of the plurality of delay lines into the first path.

Example 16 is the noise filter of any one of examples 11-15, wherein the third combiner is a balun having an inverted input and a non-inverted input.

Example 17 is the noise filter of any one of examples 11-16, wherein at least one of the first combiner, the second combiner, and the third combiner is a multiplexer.

Example 18 is the noise filter of any one of examples 11-17, further comprising an analog-to-digital converter configured to receive the third combined signal and output a digital signal representing the third combined signal; and a filter configured to receive the digital signal and output a filtered digital signal.

Example 19 is noise filter of any one of examples 11-18, wherein each of the first and second split signals include substantially the entire bandwidth of the positive signal, and each of the third and fourth signals include substantially the entire bandwidth of the negative signal.

Example 20 is a noise filter, comprising a first multiplexer configured to receive a positive signal of a differential signal pair and separate the positive signal into a positive high frequency band signal and a positive low frequency band signal; a second multiplexer configured to receive a negative signal of the differential signal pair and separate the negative signal into a negative high frequency band signal and a negative low frequency band signal; a first path configured to receive the negative high frequency band signal, the first path including: a first variable attenuator, and a first variable delay line; a second path configured to receive the positive high frequency band signal; a third path configured to receive the negative low frequency band signal, the third path including: a second variable attenuator, and a second variable delay line; a fourth path configured to receive the negative low frequency band signal; a first combiner configured to combine a signal from the first path and a signal from the second path into a first combined signal; a second combiner configured to combine a signal from the third path and a signal from the fourth path into a second combined signal; and a third multiplexer configured to combine the first combined signal and the second combined signal into a third combined signal.

Example 21 is the noise filter of example 20, wherein the second path and the fourth path each includes a fixed delay line.

Examples 22 is the noise filter of either one of examples 20 or 21, wherein at least one of the first variable attenuator, the first variable delay line, the second variable attenuator and the second variable delay line are adjusted by a controller.

Example 23 is the noise filter of any one of examples 20-22, wherein at least one of the first variable attenuator and the second variable attenuator includes a plurality of attenuators, each attenuator having a different attenuation amount; and a plurality of switches, wherein the at least one of the first variable attenuator and the second variable attenuator is adjusted by switching one of the plurality of attenuators to the first path.

Example 24 is the noise filter of any one of examples 20-23, wherein at least one of the first variable delay line and the second variable delay includes a plurality of delay lines, each delay line having a different delay amount; and a plurality of switches, wherein at least one of the first variable delay line and the second variable delay is adjusted by switching one of the plurality of delay lines to the first path.

Example 25 is the noise filter of any one of examples 20-24, further comprising an analog-to-digital converter configured to receive the third combined signal and output a digital signal representing the third combined signal; and a filter configured to receive the digital signal and output a filtered digital signal.

Example 26 is a method, comprising splitting a signal into at least a first split signal and a second split signal, each of the first and second split signal including substantially the entire bandwidth of the input signal; setting an attenuation amount for a variable attenuator; setting a delay amount for a variable delay line; attenuating by the attenuation amount the first split signal through the variable attenuator; delaying by the delay amount the first attenuated split signal through the variable delay line; and combining the delayed and attenuated first split signal and the second split signal into a combined signal.

Example 27 is the method of example 26, further comprising delaying the second split signal through a fixed delay line prior to combining the second split signal and the delayed and attenuated first split signal.

Example 28 is the method of either one of examples 26 or 27, wherein setting the attenuation amount for the variable attenuator includes switching in one of a plurality of different attenuators.

Example 29 is the method of any one of examples 26-28, wherein setting the delay amount for the variable delay line includes switching in one of a plurality of different delay lines.

Example 30 is the method of any one of examples 26-29, wherein the signal is a first signal, the method further comprising splitting an input signal into a high frequency band signal and a low frequency band signal, wherein the first signal is the low frequency band signal.

Example 31 is the method of example 30, wherein the combined signal is a first combined signal, and the method further comprises combining the first combined signal and the high frequency band signal into a second combined signal.

Example 32 is the method of any one of examples 26-31, further comprising converting the combined signal into a digital signal representing the combined signal; and filtering the digital signal to reduce noise from the input signal added by a test and measurement instrument.

Example 33 is a computer readable storage medium having instructions stored thereon that, when executed by one or more processors of a noise filter, cause the noise filter to split a signal into at least a first split signal and a second split signal, each of the first and second split signal including substantially the entire bandwidth of the input signal; set an attenuation amount for a variable attenuator; set a delay amount for a variable delay line; attenuate the first split signal through the variable attenuator; delay the first split signal through the variable delay line; and combine the delayed and attenuated first split signal and the second split signal into a combined signal.

Example 34 is the computer readable storage medium of example 33, wherein the instructions further cause the noise filter to delay the second split signal through a fixed delay line prior to combining the second split signal and the delayed and attenuated first split signal.

Example 35 is the computer readable storage medium of either one of examples 33 or 34, wherein setting the attenuation amount for the variable attenuator includes switching in one of a plurality of different attenuators.

Example 36 is the computer readable storage medium of any one of examples 33-35, wherein setting the delay amount for the variable delay line includes switching in one of a plurality of different delay lines.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

We claim:
1. A noise filter, comprising:
    a splitter configured to receive a signal and split the signal into at least a first split signal and a second split signal;
    a first path configured to receive the first split signal, the first path including:
        a variable attenuator, and
        a variable delay line;
    a second path configured to receive the second split signal;

a combiner configured to combine a signal from the first path and a signal from the second path into a combined signal;

an analog-to-digital converter configured to receive the combined signal and output a digital signal representing the combined signal; and a reshaping filter configured to receive the digital signal and output a filtered digital signal that matches a specific continuous time linear equalizer shape response.

2. The noise filter of claim 1, wherein the second path includes a fixed delay line.

3. The noise filter of claim 1, wherein at least one of the variable attenuator and the variable delay line are adjusted by a controller.

4. The noise filter of claim 1, wherein the variable attenuator includes:
  a plurality of attenuators, each attenuator having a different attenuation amount; and
  a plurality of switches,
  wherein the variable attenuator is adjusted by switching one of the plurality of attenuators into the first path.

5. The noise filter of claim 1, wherein the variable delay line includes:
  a plurality of delay lines, each delay line having a different delay amount; and
  a plurality of switches,
  wherein the variable delay line is adjusted by switching one of the plurality of delay lines into the first path.

6. The noise filter of claim 1, wherein the combiner is a balun having an inverted input and a non-inverted input.

7. The noise filter of claim 1, wherein the combiner is a differential amplifier.

8. The noise filter of claim 1, further comprising a multiplexer configured to receive an input signal and separate the input signal into a high frequency band signal and a low frequency band signal, wherein the signal received by the splitter is the low frequency band signal.

9. The noise filter of claim 8, wherein the multiplexer is a first multiplexer and the combined signal is a first combined signal, and the noise filter further comprises a second multiplexer configured to receive the first combined signal and the high frequency band signal and output a second combined signal.

10. The noise filter of claim 1, wherein the signal is a positive signal of a differential signal pair, the splitter is a first splitter, the combiner is a first combiner, and the combined signal is a first combined signal, the noise filter further comprising:
  a second splitter configured to receive a negative signal of the differential signal pair and split the negative signal into at least a third split signal and a fourth split signal;
  a third path configured to receive the third split signal, the third path including:
    a second variable attenuator, and
    a second variable delay line;
  a fourth path configured to receive the fourth split signal;
  a second combiner configured to combine a signal from the second path and a signal from the third path into a second combined signal; and
  a third combiner configured to combine the first combined signal and the second combined signal into a third combined signal.

11. The noise filter of claim 10, wherein the second path and the fourth path includes a fixed delay line.

12. The noise filter of claim 10, wherein at least one of the first variable attenuator, the first variable delay line, the second variable attenuator and the second variable delay line are adjusted by a controller.

13. The noise filter of claim 10, wherein at least one of the first variable attenuator and the second variable attenuator includes:
  a plurality of attenuators, each attenuator having a different attenuation amount; and
  a plurality of switches,
  wherein the at least one of the first variable attenuator and the second variable attenuator is adjusted by switching one of the plurality of attenuators into the first path.

14. The noise filter of claim 10, wherein at least one of the first variable delay line and the second variable delay includes:
  a plurality of delay lines, each delay line having a different delay amount; and
  a plurality of switches,
  wherein at least one of the first variable delay line and the second variable delay is adjusted by switching one of the plurality of delay lines into the first path.

15. The noise filter of claim 10, wherein the third combiner is a balun having an inverted input and a non-inverted input.

16. The noise filter of claim 10, wherein at least one of the first combiner, the second combiner, and the third combiner is a multiplexer.

17. The noise filter of claim 10
  wherein the analog-to-digital converter is configured to receive the third combined signal and output the digital signal representing the third combined signal.

18. The noise filter of claim 10, wherein each of the first and second split signals include substantially the entire bandwidth of the positive signal, and each of the third and fourth signals include substantially the entire bandwidth of the negative signal.

19. The noise filter of claim 10,
  wherein the first splitter is a first multiplexer and the second splitter is a second multiplexer, and
  wherein the first split signal includes a first bandwidth of the positive signal and the second split signal includes a second bandwidth of the positive signal, the first bandwidth and the second bandwidth being different from one another, and
  wherein the third split signal includes a third bandwidth of the negative signal and the fourth split signal includes a fourth bandwidth of the negative signal, the third bandwidth and the fourth bandwidth being different from one another.

20. A method, comprising:
  splitting a signal into at least a first split signal and a second split signal;
  setting an attenuation amount for a variable attenuator;
  setting a delay amount for a variable delay line;
  attenuating by the attenuation amount the first split signal through the variable attenuator;
  delaying by the delay amount the attenuated first split signal through the variable delay line;
  combining the delayed and attenuated first split signal and the second split signal into a combined signal;
  converting the combined signal into a digital signal representing the combined signal; and
  filtering the digital signal to reduce noise from the input signal added by a test and measurement instrument.

21. The method of claim 20, further comprising delaying the second split signal through a fixed delay line prior to combining the second split signal and the delayed and attenuated first split signal.

22. The method of claim 20,
- wherein setting the attenuation amount for the variable attenuator includes switching in one of a plurality of different attenuators and/or
- wherein setting the delay amount for the variable delay line includes switching in one of a plurality of different delay lines.

23. The method of claim 20, wherein the signal is a first signal, the method further comprising splitting an input signal into a high frequency band signal and a low frequency band signal, wherein the first signal is the low frequency band signal, and wherein the combined signal is a first combined signal, and the method further comprises combining the first combined signal and the high frequency band signal into a second combined signal.

\* \* \* \* \*